US008863161B2

(12) United States Patent
Nathan

(10) Patent No.: US 8,863,161 B2
(45) Date of Patent: Oct. 14, 2014

(54) METHOD FOR THE DISTRIBUTION OF AUDIO-VISUAL INFORMATION AND A SYSTEM FOR THE DISTRIBUTION OF AUDIO-VISUAL INFORMATION

(71) Applicant: TouchTunes Music Corporation, New York, NY (US)

(72) Inventor: Guy Nathan, Nun's Island (CA)

(73) Assignee: TouchTunes Music Corporation, New York, NY (US)

( * ) Notice: Subject to any disclaimer, the term of this patent is extended or adjusted under 35 U.S.C. 154(b) by 0 days.

(21) Appl. No.: 13/962,454

(22) Filed: Aug. 8, 2013

(65) Prior Publication Data
US 2014/0026154 A1    Jan. 23, 2014

Related U.S. Application Data

(63) Continuation of application No. 13/487,545, filed on Jun. 4, 2012, now Pat. No. 8,522,303, which is a continuation of application No. 12/071,003, filed on Feb. 14, 2008, now Pat. No. 8,214,874, which is a continuation of application No. 11/155,690, filed on Jun. 20, 2005, now Pat. No. 7,356,831, which is a continuation of application No. 09/664,494, filed on Sep. 18, 2000, now abandoned.

(30) Foreign Application Priority Data

Jun. 29, 2000 (FR) ...................................... 00 08394

(51) Int. Cl.
H04N 7/16        (2011.01)
H04N 21/2543     (2011.01)

(52) U.S. Cl.
CPC ..................................... H04N 7/16 (2013.01); H04N 21/2543 (2013.01)
USPC ................................. 725/5; 725/86; 725/151

(58) Field of Classification Search
CPC ............................. H04N 21/2543; H04N 7/16
USPC ................................................ 725/5, 86, 151
See application file for complete search history.

(56) References Cited

U.S. PATENT DOCUMENTS 3,807,541 A    4/1974   Kortenhaus
3,982,620 A    9/1976   Kortenhaus
(Continued)

FOREIGN PATENT DOCUMENTS

AU    199954012    4/2000
DE    3406058      8/1985
(Continued)

OTHER PUBLICATIONS

"About Ecast", date unknown, leaflet.
(Continued)

Primary Examiner — Kieu Oanh T Bui
(74) Attorney, Agent, or Firm — Nixon & Vanderhye PC

(57) ABSTRACT

A jukebox system, including a server that stores a master library of audiovisual selections; a plurality of jukeboxes, each of which is operable to store audiovisual selections received from the server and to play the audiovisual selections at the request of a user; a communication system through which the server and the jukeboxes communicate; wherein the server is operable to define authorized uses for the audiovisual selections received from the server; and further wherein the authorized uses correspond to various rights that third parties have in the audiovisual selections, the rights requiring by law or regulation payment of respective royalties; and further wherein the server maintains information on the authorized uses made by each of the jukeboxes and determines the amount of royalties due.

20 Claims, 4 Drawing Sheets

(56) References Cited

U.S. PATENT DOCUMENTS

| | | |
|---|---|---|
| 4,008,369 A | 2/1977 | Theurer et al. |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt et al. |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn et al. |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimaru |
| 5,077,607 A | 12/1991 | Johnson et al. |
| 5,081,534 A | 1/1992 | Geiger et al. |
| 5,101,499 A | 3/1992 | Streck et al. |
| 5,106,097 A | 4/1992 | Levine |
| 5,117,407 A | 5/1992 | Vogel |
| 5,138,712 A | 8/1992 | Corbin |
| 5,148,159 A | 9/1992 | Clark et al. |
| 5,155,847 A | 10/1992 | Kirouac |
| 5,159,678 A | 10/1992 | Wengelski et al. |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,335,313 A | 8/1994 | Douglas |
| 5,339,095 A | 8/1994 | Redford |
| 5,339,413 A | 8/1994 | Koval |
| 5,341,350 A | 8/1994 | Frank |
| 5,355,302 A | 10/1994 | Martin et al. |
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Bouton |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,473,746 A | 12/1995 | Pritt et al. |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |

(56) References Cited

U.S. PATENT DOCUMENTS

| | | |
|---|---|---|
| 5,532,734 A | 7/1996 | Goertz |
| 5,532,991 A | 7/1996 | Sasaki |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,559,714 A | 9/1996 | Banks et al. |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay et al. |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankowitz |
| 5,708,811 A | 1/1998 | Arendt |
| 5,712,976 A | 1/1998 | Falcon et al. |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,827 A | 2/1998 | Logan et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos et al. |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,748,954 A | 5/1998 | Mauldin |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |
| 5,774,672 A | 6/1998 | Funahashi |
| 5,778,395 A | 7/1998 | Whiting |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,828,343 A | 10/1998 | MacDonald et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,139 A | 3/1999 | Madison, Jr. et al. |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Bleidt et al. |
| 5,923,885 A | 7/1999 | Johnson |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |

(56) References Cited

U.S. PATENT DOCUMENTS

| | | |
|---|---|---|
| 5,959,869 A | 9/1999 | Miller |
| 5,959,945 A | 9/1999 | Kleiman |
| 5,960,167 A | 9/1999 | Roberts et al. |
| 5,963,916 A | 10/1999 | Kaplan |
| 5,966,495 A | 10/1999 | Takahashi |
| 5,970,467 A | 10/1999 | Alavi |
| 5,978,855 A | 11/1999 | Metz et al. |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,023,705 A | 2/2000 | Bellinger et al. |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,175 B1 | 4/2001 | Sliger et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |
| 6,288,688 B1 | 9/2001 | Hughes et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,301,710 B1 | 10/2001 | Fujiwara |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Owens et al. |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,353,820 B1 | 3/2002 | Edwards et al. |
| 6,356,971 B1 | 3/2002 | Katz et al. |
| 6,359,616 B1 | 3/2002 | Ogura et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,130 B1 | 9/2002 | Grapes |
| 6,449,688 B1 | 9/2002 | Peters et al. |
| 6,470,496 B1 | 10/2002 | Kato et al. |
| 6,473,794 B1 | 10/2002 | Guheen et al. |
| 6,488,508 B2 | 12/2002 | Okamoto |
| 6,490,570 B1 | 12/2002 | Numaoka |
| 6,493,871 B1 | 12/2002 | McGuire et al. |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| 6,560,651 B2 | 5/2003 | Katz et al. |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,724,974 B2 | 4/2004 | Naruto et al. |
| 6,728,824 B1 | 4/2004 | Chen |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,762,585 B2 | 7/2004 | Liao |
| 6,789,215 B1 | 9/2004 | Rupp et al. |
| 6,816,578 B1 | 11/2004 | Kredo et al. |
| 6,850,252 B1 | 2/2005 | Hoffberg |
| 6,898,161 B1 | 5/2005 | Nathan |
| 6,904,592 B1 | 6/2005 | Johnson |
| 6,920,614 B1 | 7/2005 | Schindler et al. |
| 6,928,653 B1 | 8/2005 | Ellis et al. |
| 6,934,700 B1 | 8/2005 | Ijdens et al. |
| 6,942,574 B1 | 9/2005 | LeMay et al. |

(56) References Cited

U.S. PATENT DOCUMENTS

| | | |
|---|---|---|
| 6,974,076 B1 | 12/2005 | Siegel |
| 7,024,485 B2 | 4/2006 | Dunning et al. |
| 7,073,172 B2 | 7/2006 | Chamberlain |
| 7,103,583 B1 | 9/2006 | Baum et al. |
| 7,107,109 B1 | 9/2006 | Nathan et al. |
| 7,111,129 B2 | 9/2006 | Percival |
| 7,114,013 B2 | 9/2006 | Bakke et al. |
| 7,124,194 B2 | 10/2006 | Nathan et al. |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,205,471 B2 | 4/2007 | Looney et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,281,652 B2 | 10/2007 | Foss |
| 7,293,277 B1 | 11/2007 | Nathan |
| 7,356,831 B2 | 4/2008 | Nathan |
| 7,406,529 B2 | 7/2008 | Reed |
| 7,415,707 B2 | 8/2008 | Taguchi et al. |
| 7,418,474 B2 | 8/2008 | Schwab |
| 7,424,731 B1 | 9/2008 | Nathan et al. |
| 7,430,736 B2 | 9/2008 | Nguyen et al. |
| 7,433,832 B1 | 10/2008 | Bezos et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,533,182 B2 | 5/2009 | Wurtzel et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,657,910 B1 | 2/2010 | McAulay et al. |
| 7,749,083 B2 | 7/2010 | Nathan et al. |
| 7,757,264 B2 | 7/2010 | Nathan |
| 7,761,538 B2 | 7/2010 | Lin et al. |
| 7,770,165 B2 | 8/2010 | Olson et al. |
| 7,778,879 B2 | 8/2010 | Nathan et al. |
| 7,783,593 B2 | 8/2010 | Espino |
| 7,783,774 B2 | 8/2010 | Nathan et al. |
| 7,793,331 B2 | 9/2010 | Nathan et al. |
| 7,819,734 B2 | 10/2010 | Nathan et al. |
| 7,822,687 B2 | 10/2010 | Brillon et al. |
| 8,214,874 B2 | 7/2012 | Nathan |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0126141 A1 | 9/2002 | Mastronardi |
| 2002/0129036 A1 | 9/2002 | Ho Yuen Lok et al. |
| 2002/0162104 A1 | 10/2002 | Raike et al. |
| 2003/0005099 A1 | 1/2003 | Sven et al. |
| 2003/0006911 A1 | 1/2003 | Smith et al. |
| 2003/0008703 A1 | 1/2003 | Gauselmann |
| 2003/0018740 A1 | 1/2003 | Sonoda et al. |
| 2003/0031096 A1 | 2/2003 | Nathan et al. |
| 2003/0041093 A1 | 2/2003 | Yamane et al. |
| 2003/0065639 A1 | 4/2003 | Fiennes et al. |
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1 | 6/2003 | Itkis et al. |
| 2003/0108164 A1 | 6/2003 | Laurin et al. |
| 2003/0135424 A1 | 7/2003 | Davis et al. |
| 2003/0191753 A1 | 10/2003 | Hoch |
| 2003/0208586 A1 | 11/2003 | Mastronardi et al. |
| 2003/0225834 A1 | 12/2003 | Lee et al. |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2005/0060405 A1 | 3/2005 | Nathan et al. |
| 2005/0073782 A1 | 4/2005 | Nathan |
| 2005/0086172 A1 | 4/2005 | Stefik |
| 2005/0125833 A1 | 6/2005 | Nathan et al. |
| 2005/0267819 A1 | 12/2005 | Kaplan |
| 2006/0018208 A1 | 1/2006 | Nathan et al. |
| 2006/0035707 A1 | 2/2006 | Nguyen et al. |
| 2006/0062094 A1 | 3/2006 | Nathan et al. |
| 2006/0227673 A1 | 10/2006 | Yamashita et al. |
| 2006/0239131 A1 | 10/2006 | Nathan et al. |
| 2006/0293773 A1 | 12/2006 | Nathan et al. |
| 2007/0086280 A1 | 4/2007 | Cappello et al. |
| 2007/0121430 A1 | 5/2007 | Nathan |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0247979 A1 | 10/2007 | Brillon et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0155588 A1 | 6/2008 | Roberts et al. |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0239887 A1 | 10/2008 | Tooker et al. |
| 2009/0037969 A1 | 2/2009 | Nathan et al. |
| 2009/0070341 A1 | 3/2009 | Mastronardi et al. |
| 2009/0138111 A1 | 5/2009 | Mastronardi |
| 2009/0172565 A1 | 7/2009 | Jackson et al. |
| 2009/0265734 A1 | 10/2009 | Dion et al. |
| 2009/0282491 A1 | 11/2009 | Nathan |
| 2010/0042505 A1 | 2/2010 | Straus |
| 2010/0211818 A1 | 8/2010 | Nathan et al. |
| 2010/0241259 A1 | 9/2010 | Nathan |
| 2010/0269066 A1 | 10/2010 | Nathan |
| 2010/0299232 A1 | 11/2010 | Nathan et al. |
| 2011/0066943 A1 | 3/2011 | Brillon et al. |
| 2012/0240140 A1 | 9/2012 | Nathan |

FOREIGN PATENT DOCUMENTS

| | | |
|---|---|---|
| DE | 3723737 | 1/1988 |
| DE | 3820835 | 1/1989 |
| DE | 3815071 | 11/1989 |
| DE | 4244198 | 6/1994 |
| DE | 19610739 | 9/1997 |
| DE | 19904007 | 8/2000 |
| EP | 0082077 | 6/1983 |
| EP | 0140593 | 5/1985 |
| EP | 0256921 | 2/1988 |
| EP | 0283304 | 9/1988 |
| EP | 0283350 | 9/1988 |
| EP | 0309298 | 3/1989 |
| EP | 0313359 | 4/1989 |
| EP | 0340787 | 11/1989 |
| EP | 0363186 | 4/1990 |
| EP | 0425168 | 5/1991 |
| EP | 0464562 | 1/1992 |
| EP | 0480558 | 4/1992 |
| EP | 0498130 | 8/1992 |
| EP | 0507110 | 10/1992 |
| EP | 0529834 | 3/1993 |
| EP | 0538319 | 4/1993 |
| EP | 0631283 | 12/1994 |
| EP | 0632371 | 1/1995 |
| EP | 0711076 | 5/1996 |
| EP | 0786122 | 7/1997 |
| EP | 0817103 | 1/1998 |
| EP | 0841616 | 5/1998 |

(56) References Cited

FOREIGN PATENT DOCUMENTS

| | | |
|---|---|---|
| EP | 0919964 | 6/1999 |
| EP | 0959570 | 11/1999 |
| EP | 0974896 | 1/2000 |
| EP | 0974941 | 1/2000 |
| EP | 0982695 | 3/2000 |
| EP | 1001391 | 5/2000 |
| EP | 1170951 | 1/2002 |
| EP | 1288802 | 3/2003 |
| EP | 1408427 | 4/2004 |
| EP | 1549919 | 4/2004 |
| FR | 2602352 | 2/1988 |
| FR | 2808906 | 11/2001 |
| GB | 2122799 | 1/1984 |
| GB | 2166328 | 4/1986 |
| GB | 2170943 | 8/1986 |
| GB | 2193420 | 2/1988 |
| GB | 2238680 | 6/1991 |
| GB | 2254469 | 10/1992 |
| GB | 2259398 | 3/1993 |
| GB | 2262170 | 6/1993 |
| GB | 2380377 | 4/2003 |
| JP | 57173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 07281682 | 10/1995 |
| JP | 8274812 | 10/1996 |
| JP | 08279235 | 10/1996 |
| JP | 9114470 | 5/1997 |
| JP | 9127964 | 5/1997 |
| JP | 10-098344 | 4/1998 |
| JP | 10222537 | 8/1998 |
| JP | 07504517 | 3/2007 |
| WO | WO 86/01326 | 2/1986 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO 94/03894 | 2/1994 |
| WO | WO 94/14273 | 6/1994 |
| WO | WO 94/15306 | 7/1994 |
| WO | WO 94/15416 | 7/1994 |
| WO | WO 95/03609 | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96/12258 | 4/1996 |
| WO | WO 98/07940 | 2/1998 |
| WO | WO 98/11487 | 3/1998 |
| WO | WO 98/45835 | 10/1998 |
| WO | WO 99/35753 | 7/1999 |
| WO | WO 01/00290 | 1/2001 |
| WO | WO 01/08148 | 2/2001 |
| WO | WO 02/095752 | 11/2002 |
| WO | WO 03/069613 | 8/2003 |
| WO | WO 2004/029775 | 4/2004 |
| WO | WO 2006/014739 | 2/2006 |

OTHER PUBLICATIONS

Austin Cyber Limits: Name That Tune [online], [retrieved Jul. 23, 2001]. Retrieved from the Internet: <http://www.pbs.ork/klru/austin/games/namethattune.html>.
Back to the Tunes [online], [retrieved Jul. 23, 2001]. Retrieved from the Internet: <http://citc5.hispeed.com/rules.html>.
Bonczek et al, "The DSS Development System", 1983 National Computer Conference, Anaheim, California, May 16-19, 1983, pp. 441-455.
Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogeneous multimedia streams", ACM Multimedia, pp. 1-7, 1993.
Crutcher et al., "The networked video Jukebox", IEEE, Trans. on circuits and systems for video technology, vol. 4, No. 2, pp. 105-120, 1994.
"Darts Revolution Again", Replay Magazine, Mar. 1991, pp. 146-148.
Decision of the European Patent Office to revoke the related EP Patent No. 786 125, Feb. 17, 2005.
Derfler et al., "How Networks Work", Millennium Ed., Que Corporation, Jan. 2000.
Drews, C.; Pestoni, F.; "Virtual jukebox: reviving a classic," Proceedings of the 35th Annual Hawaii International Conference System Sciences, pp. 887-893, Jan. 7-10, 2002.
"Ecast Forges Landmark International Technology Partnership", Business Wire at www.findarticles.com/cf_0/m0EIN/2000_July_25/63663604/print.html, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
European Search Report from EP 1 993 079.
European Search Report issued for European Application No. 08000845.1-1238/1962251, dated Apr. 3, 2009.
Fachbuch, "Unterhaltungselektronic von A-Z" gfu 1, VDE-Verlag GmbH, pp. 12-13, 1983-1984.
Gallardo et al., "Tangible Jukebox: back to palpable music", ACM TEI, pp. 199-202, 2010.
Gralla, "How the Internet Works", Millennium Ed., Que Corporation, Aug. 1999.
Grimes, Chapter 18, "Taking Advantage of Web-based Audio".
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
IBM Technical Disclosure Bulletin, vol. 41, No. 1, Jan. 1998, "Safe Mechanism for Installing Operating System Updates with Applications," pp. 557-559.
International Search Report for PCT/US2009/003998, mailed Aug. 17, 2009.
International Search Report for PCT/US2011/22598, mailed Mar. 29, 2011.
iTouch 8 Plus brochure, JVL Corporation, 2005, 2 pages.
iTouch 27 New Games brochure, JVL Corporation, 2005, 2 pages.
Johnny Rockets Name That Tune [online], [retrieved Mar. 7, 2002]. Retrieved from the Internet: <http://www.johnnyrockets.com/docs/funstuff.html>.
Koskelainem, "Report on Streamworks™".
Kozierok, The PC Guide, Site Version 2.2.0, http://www.pcguide.com, Apr. 17, 2001.
Kraiss et al., "Integrated document caching and prefetching in storage hierarchies based on Markov chain predictions", The VLDB Journal, vol. 7, issue 3, pp. 141-162, 1998.
Liang et al., "Dynamic class loading in the Java virtual machine", ACM OOPSLA, pp. 36-44, 1998.
Look and iTouch brochure, JVL Corporation, 2004, 2 pages.
Ludescher et al., "File Storage Management for TFTF physics data", IEEE, pp. 856-859, 1992.
Megatouch Champ brochure, Merit Industries, Inc., 2005, 2 pages.
Melnik et al., "A mediation infrastructure for digital library services", ACM DL, pp. 123-132, 2000.
Merriam Webster's Collegiate Dictionary, Tenth Edition, Merriam-Webster, Inc., p. 361 (definition of dynamically).

(56) References Cited

OTHER PUBLICATIONS

Mod Box Internet brochure, Merit Entertainment, 2006, 2 pages.
Newsome et al., "Proxy compilation of dynamically loaded java classes with MoJo", ACM LCTES, pp. 204-212, 2002.
Outlaw, Computer Technology Review, "Virtual Servers Offer Performance Benefits for Network Imaging", 1993.
Patent Abstract of Japan vol. 95, No. 010 & JP 07 281682 A (Naguo Yuasa), Oct. 27 1 JP 07 281682, figure 1-6 abrége.
Pohlmann, "Principles of Digital Audio", Third Edition, 1995.
PR Newswire, Press Release, "MusicMatch Announces Commerical Availability of Meta Trust Certified MusicMatch jukebox", New York; Nov. 15, 1999, extracted from Internet, http://proquest.umi.com on Sep. 17, 2002.
Rollins et al., "Pixie: A jukebox architecture to support efficient peer content exchange", ACM Multimedia, pp. 179-188, 2002.
Schneier, "Applied Cryptography", Second Edition, John Wiley & Sons, Inc. New York, 1996.
Sprague et al., "Music selection using the partyvote democratic Jukebox", ACM AVI, pp. 433-436, 2008.
Stevens, "TCP/IP Illustrated: vol. 1, the Protocols".
Stewart, "Ecast Deploys Marimba's Castanet to Power an Internet-Based, Entertainment Management System for the Out-of-Home Market", Marimba, Press Release, 3 pages, www.marimba.com/news/releases/ecast.dec13.html, Dec. 13, 1999.
Strauss et al., "Information Jukebox A semi public device for presenting multimedia information content", Pers. Ubiquit Comput, 7, pp. 217-220, 2003.
Summary of the oral proceedings regarding EP 786 125 before the Opposition Division of the European Patent Office, Feb. 17, 2005.
Tom & Liz's Name That Tune [online], [retrieved Jul. 23, 2001]. Retrieved from the Internet: <http://home.att.net/~tomnliz/Music.html>.
U.S. Appl. No. 29/371,355, Garneau et al., filed Dec. 14, 2010.
U.S. Appl. No. 61/129,637, Dion, filed Jul. 9, 2008.
U.S. Appl. No. 61/202,617, Dion, filed Mar. 18, 2009.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, (Sep. 22, 1999).

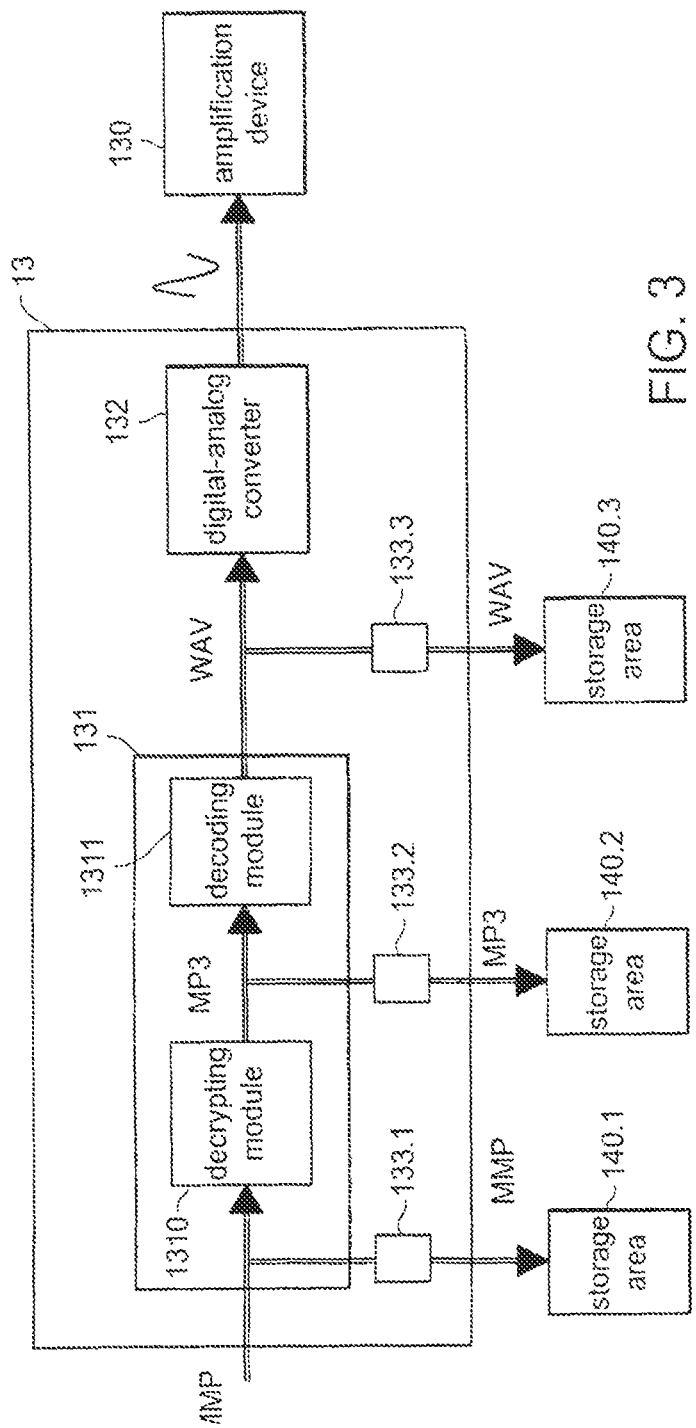

METHOD FOR THE DISTRIBUTION OF AUDIO-VISUAL INFORMATION AND A SYSTEM FOR THE DISTRIBUTION OF AUDIO-VISUAL INFORMATION

CROSS-REFERENCES TO RELATED APPLICATIONS

This application is a continuation of application Ser. No. 13/487,545 filed Jun. 4, 2012, which is a continuation of application Ser. No. 12/071,003 filed Feb. 14, 2008, which is a continuation of application Ser. No. 11/155,690 filed Jun. 20, 2005, which is a divisional of application Ser. No. 09/664,494 filed Sep. 18, 2000, which claims priority to French Application No. 0008394 filed Jun. 29, 2000, the entire contents of each of which are hereby incorporated by reference in this application.

FIELD OF THE INVENTION

This invention relates to a method for the distribution of audio-visual information and a system for the distribution of audio-visual information.

BACKGROUND OF THE INVENTION

In the prior art, devices are known that permit a user having a terminal and a connection to a server of audio-visual information to download pieces of music in order to listen to them in real time or to store them in data storage means, either connected to the terminal, or transportable so as to be able to play them back or duplicate the pieces of music an unlimited number of times. However, most of these devices do not permit the calculation of royalties due to those having rights to the pieces of music since none of these devices enable the use made of the piece of music to be verified.

OBJECT AND SUMMARY OF THE INVENTION

Hence, this invention has the objective of remedying the disadvantages of the prior art by proposing a method of distributing audio-visual information enabling one to identify and to calculate the rights of reproduction of the audio-visual information distributed.

This first objective is achieved by a method for the distribution of audio-visual information between a server and at least one terminal connected by bi-directional means of communication to the server characterized in that it comprises: a step of registering each terminal at the server to identify the terminal in a unique way and to record the type of terminal, a step of authenticating the terminal by the server on the occasion of each connection of the terminal to the server, a step of downloading at least one selection of audio-visual information chosen by the user of the terminal during its connection to the server, the format in which the selections of audio-visual information are transmitted being such that the destination terminal can make use of them, a step of storing the use made of each selection of audio-visual information in a data base of the server.

In another embodiment, the use of a selection of audio-visual information comprises, either the running in real time of the audio-visual information on the destination terminal, or the storing of the audio-visual information for the purpose of running it on the destination terminal, or the running, in real time, of the audio-visual information, after storing the audio-visual information on the destination terminal.

In another embodiment, the authentication step includes a step of the terminal sending stored information relating to the desired uses to be made of the audio-visual information downloaded onto the terminal.

In another embodiment, the method includes a step in which the server processes information stored or received and relating to the uses for the audio-visual information downloaded onto the terminal in order to determine the amount of royalties to be paid to each of the parties having rights over the audio-visual information.

In another embodiment, the registration step comprises a step of sending decoding and/or decryption means as a function of the format in which the audio-visual information will be transmitted to the terminal and which corresponds to the specified uses.

In another embodiment, the type of terminal defines the use which will be made of the audio-visual information on the terminal.

In another embodiment, the method comprises a step of paying for the selections commanded, either during the authentication step or during the choice of the user, or before the downloading step.

In another embodiment, the method comprises a step of storing on the terminal statistical records concerning the use of the selections stored by the terminal and a step of sending, by the terminal, of information corresponding to the statistical records, during connection between the terminal and the server.

A second aim of the invention consists of proposing a system for the distribution of audio-visual information which permits the calculation of the rights of reproduction of audio-visual information distributed.

This second objective is achieved by a device for the distribution of audio-visual information comprising a server including mass data storage means that include audio-visual information for representing a plurality of musical and/or video selections, and at least one terminal including data storage means and a bi-directional communication link with the server, the device being characterized in that the data storage means of the server comprise an identification of each terminal defining the use of the audio-visual information transmitted to the terminal, each terminal comprising means interactive with the user to permit the choice of at least one selection through the communication link with the server and means of running the information sent by the server and representative of an audio-visual selection.

In another embodiment, the running means comprise means of running the audio-visual information sent by the server in real time, on the terminal.

In another embodiment, the running means comprise means of forbidding the re-use of the audio-visual information sent.

In another embodiment, the running means of the terminal comprise means of storing the audio-visual information sent.

In another embodiment, the terminal comprises means of recording information relating to the use made of the selections sent by the server to the terminal.

In another embodiment, the server includes means of calculating royalties to be paid to each of the parties having a right over the use of the selections sent to the terminals, from information recorded by the server and transmitted by each terminal and relating to the use of the selections.

In another embodiment, the exploitation means comprise a Digital Signal Processor DSP comprising means of decoding audio-visual information transmitted by the server in order to provide digital information, a digital-analog converter, at least one output for digital information to data storage means and command means for each digital output in order to authorize or not to authorize the storage of the digital information.

It must be obvious to persons skilled in the art that this invention permits embodiments in numerous other specific forms without departing from the field of application of the invention as claimed. Consequently, these embodiments must be considered as being given for illustrative purposes and may be modified within the field defined by the scope of the attached claims.

In another embodiment, the interactive comprising selection means including a pointer and or a touch screen associated with displays means for displaying at least one dialogue screen, and/or a vocal command system associated with audio reproduction means for restituting at least one vocal message.

BRIEF DESCRIPTION OF DRAWINGS

The invention, with its characteristics and advantages, will emerge more clearly on reading the description made making reference to the appended drawings in which:

FIG. 3 represents a diagram of the terminal of the device for the distribution of audio-visual information according to the invention.

DESCRIPTION OF THE PREFERRED EMBODIMENTS

Figure 1A:
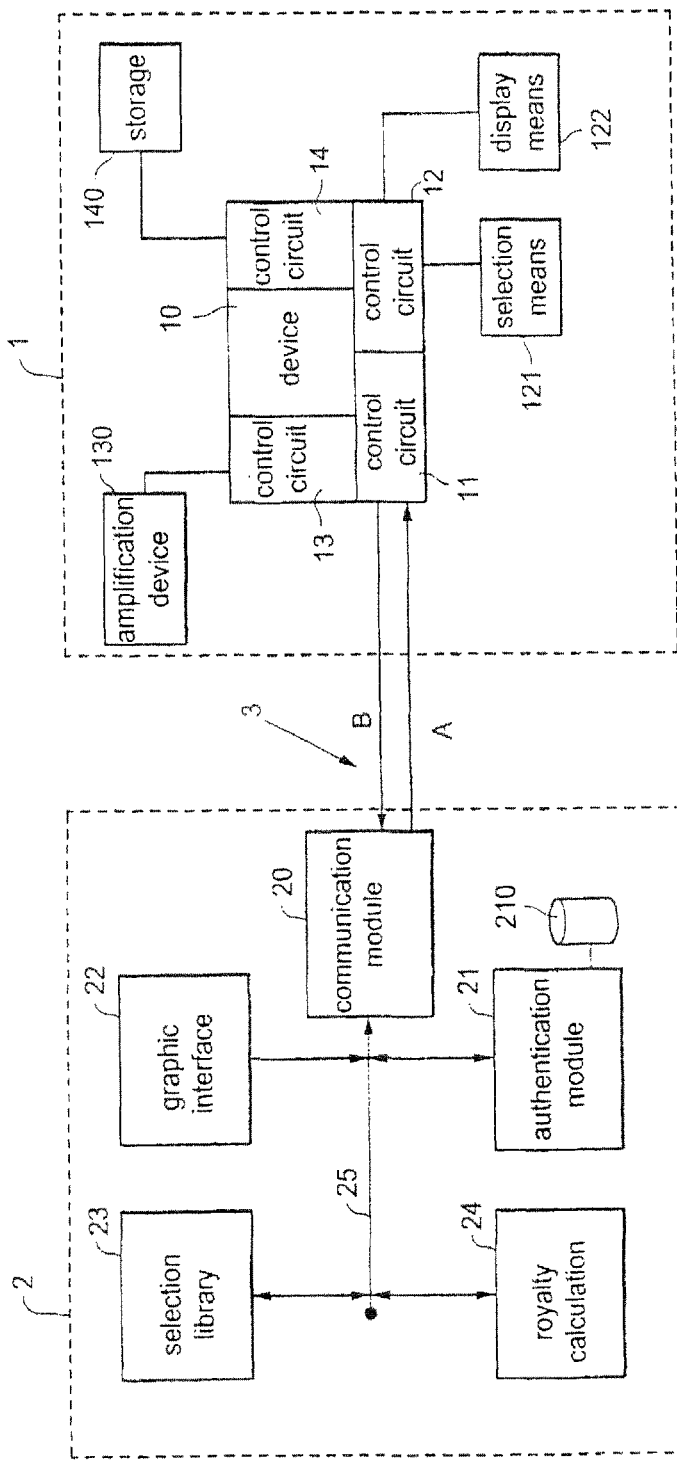
FIG. 1A represents a simplified diagram of the device for the distribution of audio-visual information according to an embodiment of the invention.

Before describing the invention, it should be recalled in which context the broadcasting of audio-visual information is located. Firstly, by information or audio-visual selections, one must understand digital information or information arising from digitization that is representative of an artistic work. According to legislation currently in force in most countries, no sound reproduction or copy of an artistic work can be made without the agreement of the person or persons having rights to it, namely, in particular, its authors and/or composers and/or interpreters and/or promoters (recording company) and/or distributors. As a general rule, this or these agreement(s) is/are given in exchange for the payment of royalties.

By way of example, we will describe in what follows, the scope and the contents of certain rights.

The rights to artistic audio-visual works are of several types and are a function in particular, of the use which is made of the, artistic work. In the case of a musical work, first of all there are rights linked to the sound reproduction of the work. Hence as soon as a musical work is reproduced, that is to say, as soon as it is played on a sound playback device, master rights are due to all or some of those having rights. When the musical work is copied, that is to say, information representative of the musical work is transferred onto another medium, then, for each copy of the work, mechanical rights are due to all or some of those having rights. Hence any downloading of a song from a memory of a server to another memory of a remote terminal constitutes a copy of an artistic work.

When the artistic work consists of the association of still or moving images with sound, the reproduction of this work also gives rise to synchronization rights which can be negotiated by mutual agreement by the legal representatives of those having rights and authorized to collect the royalties according to regulations which are predefined but may vary from one work to another.

When an artistic audio-visual work is reproduced in public, it gives rise, in certain cases, to public performance rights, recognized in general by legal bodies who represent parties having rights and who are authorized to collect the royalties in accordance with regulations which are predefined but may vary from one work to another.

The rights which have just been mentioned are, by way of example. Other rights linked to the use of artistic audio-visual works can exist or arise. Similarly, the definition of the rights and particularly their conditions of application can change. However, whatever the type of right stemming from the use of an artistic work and whatever its application conditions, the method and the device according to the invention can be applied.

As previously explained, the devices for the distribution of audio-visual information of the prior art did not provide means enabling one to determine the total amount to be paid to those having rights and did not exercise any controls whatsoever over the use of the audio-visual selections once they had been distributed. Consequently, the distribution of audio-visual information using these devices of the prior art is most of the time carried out regardless of the rights of third parties to the artistic works corresponding to the audio-visual information.

This invention proposes to resolve this problem by providing a device and a method for the distribution of audio-visual information that enables one to take into account the payment of royalties and taxes to those having rights to an artistic work, when the work is commanded using a terminal connected to a server specialized in the distribution of artistic works in the form of audio-visual information through a communication network.

One non-limitative embodiment of the invention will now be described making reference to FIGS. 1A and 1B. The device described in what follows enables one to take into account rights linked to the sound reproduction and the rights linked to the copying of sound works in particular. However, by applying the same principles, it is possible to take into account all the rights linked to any sort of use of an audio-visual work.

The distribution device according to the invention comprises a server 2 for the distribution of audio-visual information connected by a bi-directional communication link 3 to at least one remote terminal 1. FIG. 1A only shows a single terminal. However, the server 2 according to the invention can be connected in a simultaneous fashion and through links of various types to several terminals 1.

The server 2 includes a module 20 for the management of communication with the terminals 1. This module 20 can include different sub-modules so as to take into account the different possible types of communications' links. Hence, a first sub-module comprises a communication interface that permits linkage to an ISDN or Integrated Services Digital Network. A second sub-module comprises a communication interface that allows connection to a communication link of the satellite type. A third sub-module comprises a communication interface that permits linkage to a communication link of the telephonic type, particularly a traditional wire connection or an ADSL or cellular type of link. A fourth sub-module comprises a communication interface that permits linkage to a communication link of the television cable network type. The communication management module comprises transcription means so that, on the one hand, in the server terminal communication direction A, it transcribes the information coming from the server into the format suited to the type of linkage 3, and, on the other hand, in the terminal server communication direction B, it transcribes the information coming from the terminal into the format suited to the type of linkage 3. The communication management module 20 comprises means of analyzing signals received from the terminals 1 in order to extract from these signals, requests from the terminals or responses from the terminals 1 to the requests from the server 2. Finally, the communication management module 20 comprises means of transmitting requests or the responses to the relevant module of the server.

The communication between the different modules of the server 2 is created using a bi-directional bus 25 known of itself.

A first module 21, called an authentication module comprises, for example, in a data base 210, a piece of information representative of an identification of all the terminals 1 liable to establish a connection with the server 2. The authentication module 21 comprises means of updating the data base 210 so that each time a user wishes a new terminal to be able to connect to the server 2, a new identification is assigned to this new terminal 1. This updating is carried out, for example, using a registration procedure. This registration procedure has the purpose, on the one hand, of assigning an identifier and, for example, a pass word unique to each terminal. Similarly, this procedure specifies the use to be made of the information which will be transmitted subsequently to the server 2. In effect, there are several ways of using the audio-visual information transmitted by the server 2. In a first case, the terminal 1 can be used to listen to a musical selection commanded to the server 2, in real time. In a second case, the terminal 1 can be used to store a musical selection commanded to the server 2 in order to be replayed an unlimited number of times. Hence, in the first case, a single royalty for a single broadcast is due to those having rights. Within the second case, there are two possible situations. In a first situation, on the one hand, a royalty for copying the work must be calculated and paid and on the other hand a royalty for each sound playback of the selection must be calculated and paid. In a second situation, payment for storage of the data and its unlimited use is made as a one-off payment by the user. This situation is very similar to the purchase of songs on traditional media such as an audio CD or a cassette. In this case, the royalties can also be calculated as a one-off payment for each downloading. Hence it can be understood that the management of these uses is necessarily different since these uses give rise to royalty payments calculated in a different way. This difference in calculation resides not only in the rate applied but also in the number of times that this rate must be applied.

Hence, at the time of registration, a code or a unique key, for example, unknown to the user is assigned to the terminal to determine the use or uses which may be made of the audio-visual information sent by the server 2 to the terminal 1. This code or this unique key is associated with the identifier and to the pass word of the terminal. By use, one must understand all the uses that can be envisaged for a piece of audio-visual information, namely reproduction in a private or public context, copying and reproduction on demand or in a random fashion of a selection list.

The authentication module 21 also includes means of managing the connection of each terminal 1 registered with the server 2. These management means will be described later making reference to FIG. 2.

The server 2 includes a second module 22 called the graphic interface. This interface module 22 comprises means of sending dialogue screens to the terminals having established a connection with the server. In another embodiment variation, the dialogue screens may be complemented or replaced by vocal messages. The dialogue screens and/or the vocal messages are sent by the communications management module 21 to the terminals having established a connection with the server 2, to display on terminal 1 display means 122, screens that include selection windows, menus or any other dialogue box to guide the user in his selection command or commands and, for example, to permit the terminal 1 authentication procedure to take place when connection is made with the server 1. The graphic interface module 22 comprises means of processing either requests for a selection from the terminal 1 during the selection procedure, or requests from the authentication module 21 during the authentication procedure for the terminal 1. In effect, during the authentication procedure, the authentication module 21 must ask the terminal 1 to identify itself so as to authorize access of the terminal to the server. This request is carried out by means of a request sent by the authentication module 21 to the terminal 1 through the communications management module 20. The request includes asking for the identifier and the pass word of the terminal in order to verify that the terminal which is attempting to make the connection is properly registered, that is to say that its identifier and its pass word are correctly contained in the data base 210. This request is sent to the terminal 1 by means of a particular screen generated by the graphic interface module 22 which is then activated by the authentication module 21 so as to transmit the corresponding authentication screen to the terminal 1. In another variant, the authentication module 21 may include a sub-module generating this screen and can transmit it to the communication management module 20 for sending to the terminal 1.

The server 2 includes a third module constituting a selection library 23 of audio-visual items. This library collects together notably all the selections available for downloading to the terminals 1. The selection library 23 may also include selections which are not yet available for downloading. This case arises when the selections concerned have not been made the subject of an agreement for their broadcasting or their copying. In effect, according to the invention, a selection is only made available to the terminals when the authorizations for reproduction or for copying have been obtained from all those having rights over that selection. Hence the selections can be stored in data base form and a flag system enables one to identify that a selection is available for downloading to the terminals. For each agreement with a party having rights over the broadcasting or the copying of a selection, a flag is used indicating if the agreement has been obtained. When all the flags indicate that all the agreements have been obtained then the selection is available for downloading. If, on the contrary, a single flag indicates that an agreement has not been obtained, then the selection is not available for downloading as long as the flag remains in the same state.

The server 2 includes a fourth module 24 called the royalty calculation module. This module 24 comprises means of collecting information sent and received from each terminal 1 concerning the use which is made of the selections sent. The information collected is then stored on data storage means of the server. The royalty calculation module 24 also comprises, for example, in a data base, elements for calculating royalties as a function of the number of copies or broadcasts of each selection. These calculation elements are in particular, the royalty rates claimed for each party having rights for each use of the selection. Hence, for one and the same selection, the royalty rate for reproduction can be different to the royalty rate for copying which itself may be different to a one-off royalty for the copying of a selection with a view to its unlimited reproduction. Similarly, as previously explained, a royalty rate can be specified for every other right over the selection that exists. So as to carry out the calculation from these elements, the royalty calculation module 24 receives, for example, from the communications management module 20, information about the sending of selections to the terminals 1. As soon as a selection is transmitted to a terminal 1, the communications management module 20 notifies the collecting means of the royalty calculation module 24 by indicating to it if the selection is being sent for listening to in real time or for storage with a view to unlimited use with a one-off payment or for any other use giving rise to calculation of royalties. In effect, as previously explained, if the selection is simply listened to in real time, there is not, in relation to legislation currently in force, any change of medium and hence only reproduction rights are due. If, contrary to this, the selection is transmitted to a terminal 1 which is authorized to store the selections transmitted, then copying rights are due. In another example, if the selection is intended to be played in a public place, then performance rights are also due.

Similarly, when each terminal 1 receives, for the purposes of storage, a selection sent by the server 2, during each connection to the server 2, information determines the number of times that the selection received on the terminal 1 has been played. When the management module 20 receives this information, it notifies it to the information collection means of the royalty calculation module 24 which can then carry out the exact calculation of the royalties to be paid for each of the parties having rights as a function of the calculation elements stored in the data base. In the case where the royalties for the storage and the playback are due in the form of a one-off payment, the information determining the number of times the selection received on the terminal 1 has been played is nevertheless requested and stored for information purposes as explained later.

Each terminal 1 according to the invention is organized around a device 10 with a microprocessor. This device 10 includes a plurality of control circuits 11, 12, 13, 14 that permit management particularly of the communication with the server, the choice and the commanding of selections, listening to a selection in real time, the storage of selections and the restitution of the selections stored. A first control circuit 11 constitutes the communication interface with the communication link 3 with the server 2. This first control circuit 11 can be matched to a link that may be a telephone link, a satellite link or a cable link. The function of this first circuit 11 is substantially the same as that of the management module of the server, but on the terminal 1 side. In effect, the first control circuit 11 includes transcription means either to edit the data A arriving over the link 3 so that they are processed by the microprocessor device, or to edit the data B sent by the terminal 1 to the server 2.

The second control circuit 12 comprises interface means between the user and the terminal 1. These interface means essentially comprise display means 122 and selection means 121. The display means 122 include, for example, a monitor or a liquid crystal screen. The selection means 121 comprise, for example, a pointer, such as a mouse, or a touch screen or a vocal command system or a radio-frequency or infra-red remote command device. These interface means permit the display of selection help screens generated by the graphic interface module 22 and then sent over the communication link 3. The selection means 121 allow the user to define and then validate his selection choices or to respond to requests from the server 2, for example, during the terminal 1 authentication procedure, this being done in manual fashion by a touch screen or keyboard or remotely, for example by voice.

The third circuit 13 comprises restitution means for the selections. When the selections are musical pieces, the third circuit 13 is connected to a sound amplification device 130. An embodiment example of the third circuit 13 is shown in FIG. 3. According to this variant, the third circuit 13 is created around a signal processor designated below as DSP (Digital Signal Processor). The DSP receives the stream of audio-visual information corresponding to the selection on its input. This audio-visual information is digital data that has been compressed or encoded and possibly encrypted. According to the embodiment variation, the data are encoded in format MP3, then encrypted in a proprietary format MMP. The MMP format data are firstly decrypted by a decrypting module, 1310 in FIG. 3, to provide a stream of digital data in MP3 format. This data flow is applied to the input of a decoding module 1311 that enables one to obtain, on its output, a flow of decompressed data in a standard digital format, such as WAV format. This data flow in WAV format is then applied to the input of a digital-analog converter 132 to be sent to the sound amplification device 130. The decrypting module 1310 and the module 1311 can be exclusively of the software type or the firmware type.

As explained previously, a remotely loaded selection can be either played or stored in order to be replayed or may be played once in real time. In this latter case, the data flow must in no case be accessible to the user. In other words, the digital data must not be stored. Contrary to this, in the first case, the digital data can be stored. Hence the DSP includes at least one command 133.1, 133.2, 133.3 for access to storage means 140.1, 140.2, 140.3 of the terminal 1. This access command 133.1, 133.2, 133.3 allows or does not allow the transfer of the data flow in one of three formats MMP, MP3, WAV to an area 140.1, 140.2, 140.3 of the storage means 140 of the terminal 1. According to a first embodiment variant, each terminal is configured during the registration procedure on the server 2 for a specified use and one of the commands is validated to authorize the type of use provided for.

In a second embodiment, the terminal is upgradeable and its mode of use can be adapted when under way. In this case the server 2 sends information permitting validation for operation according to one of the three types of use defined above at the same time as the audio-visual information.

In a final embodiment, when the use provided for on the terminal does not include the storage of transmitted audio-visual information, none of commands 133.1, 133.2, 133.3 is validated which prevents any storage of the audio-visual information on the data storage means of the terminal 1.

Hence, a first access command 133.1 is sent on a link situated between a point upstream of the decrypting module 1310 and the data storage means 140.1. This first access command 133.1 allows or does not allow storage of a selection in the encoded or MMP encrypted format. A second type of access command 133.2 is sent on a link whose first end is connected between the decrypting module 1310 and the decoding module 1311 and whose second end is connected to the data storage means 140.2 of the terminal 1. Hence, this second type of access command 133.2 allows or does not allow the storage of a selection in the MP3 encoded format. Finally, a third type of access command 133.3 is sent on a link whose first end is placed between the decoding module 1311 and the digital-analog converter 132 and whose second end is connected to the data storage means 140.3 of the terminal 1. Hence this third type of access command 133.3 allows or does not allow the storage of a selection in the decompressed digital format WAV.

In order to provide better protection against fraud and in particular, against illegal copying of musical pieces, the preferred access command is the first. In effect by suppressing the second and the third access commands, the only format available for storage is the MMP format. This format being both encrypted and encoded, the stored data is unusable without the decrypting and decoding algorithms.

The protection of digital data transferred to the terminal 1 can be achieved by any other means complementary or equivalent to encoding and/or encryption.

The fourth circuit 14 manages the data storage means 140. These data storage means 140 can be of the hard disk type, removable data storage (flash memory, diskette, CD-ROM) or any other type of semi-conductor, magnetic or optical memory.

According to the invention, the terminal 1 may be, either dedicated hardware, that is to say hardware specially designed for dialogue with the server 2, or standard hardware.

When the terminal 1 is dedicated, the DSP 13, integrates both the software and the hardware elements for the decrypting and the decoding of the data flow coming from the server 2. Similarly, the identifier and the pass word are, for example, stored in advance in the data base 210 of the authentication module 21.

When the terminal 1 is a standard terminal, it must receive, by means of the first circuit controlling the link, a certain number of software elements sent, for example, by the server, for example, during the registration procedure before being able to be connected to the server 2 and being able to use the data transmitted by the server 2. Similarly, the user of the terminal 1 must possess an identifier and a pass word to be identified by the server at the time it is connected. In effect, as previously explained, the user must specify what use will be made of the selections on the terminal 1 so that the authentication module 21 assigns the code or the key which is appropriate to identify this use.

These software elements sent, for example, by the server include a configuration for the terminal 1 to authorize the dialogue between the communication management module 20 and the first circuit 11 in a way that permits, in particular, the processing of information representative of the screen display on the display means 122 of the terminal 1. Secondly, these software elements include, when this is necessary, means of decrypting and/or decoding the audio-visual information transmitted by the server 2. Thirdly, these software elements include, when the terminal 1 is authorized to store the data corresponding to the selections, means of retaining a display of all subsequent occasions on which the selections stored on the terminal 1 were run. These means of retaining a display of the selections include means of creating and updating, for example, a log file containing the number of times each selection contained on the terminal has been run as well as the dates on which the selection was run.

Figure 1B:
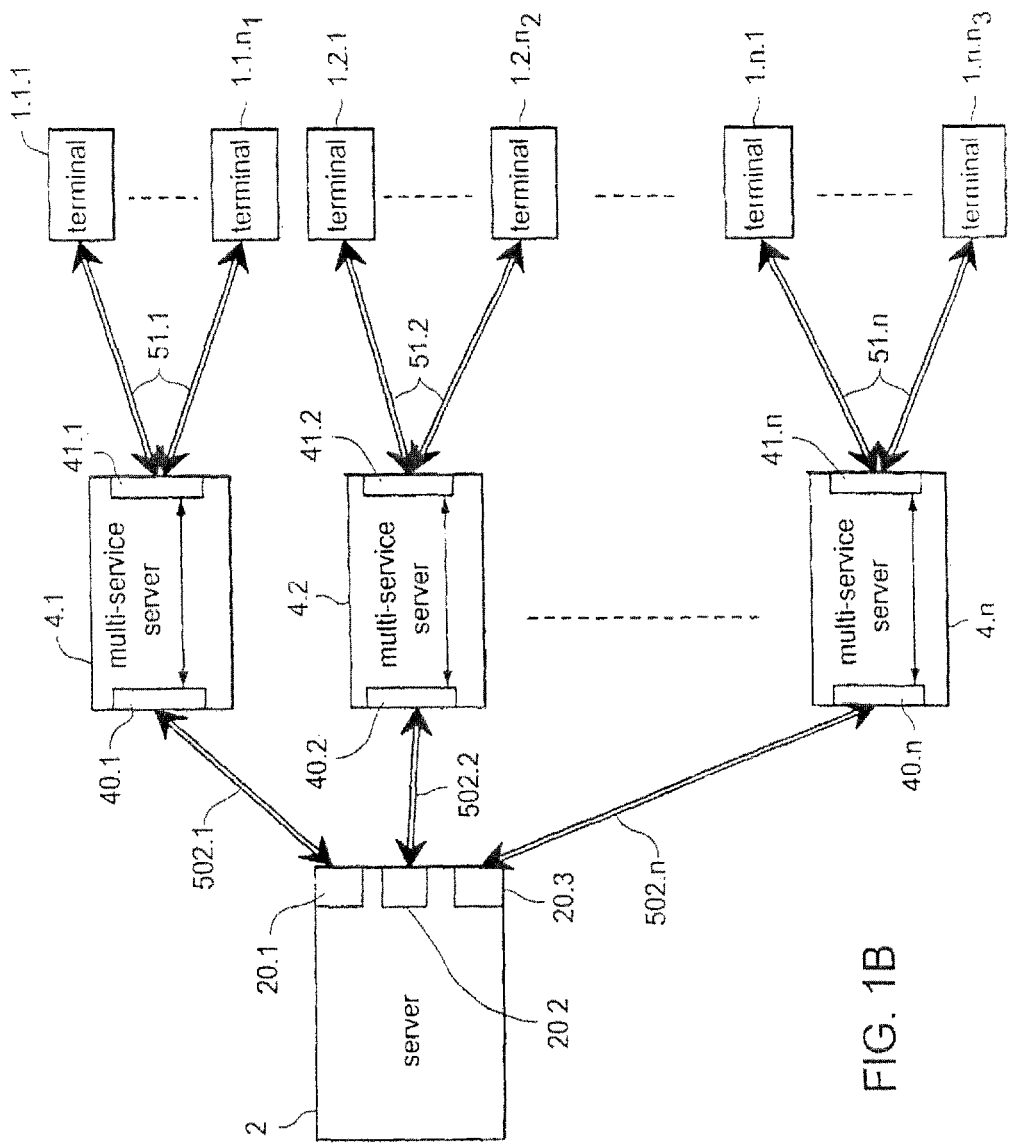
FIG. 1B shows a variation where there is one server and multiple terminals in accordance with another embodiment.

In an embodiment variation shown in FIG. 1B, the exchange of information between the server 2 and the terminals 1.1.1 to 1.*n.n*.sub.3 is carried out by means of at least one so-called multi-service server 4.1 to 4.*n*.

The terminals 1.1.1 to 1.*n.n*.sub.3 shown contain at least elements which carry out the essential functions of a terminal as described previously with reference to FIG. 1A.

The architecture shown in FIG. 1B arises when the terminals 1.1.1 to 1.*n.n*.sub.3 are already connected to a multi-service server 40.1 to 40.*n*. By way of an example, a first multi-service server 4.1 includes a system for the distribution of television programs by cable that includes a return channel. In this case, the terminals 1.1.1 to 1.1.*n*.sub.1 can be made up of a decoder coupled to a television and to appropriate selection means. A second multi-service server 4.2 is made up of a cellular telephone operator. In this case, the terminals 1.2.1 to 1.2.*n*.sub.2 can be constituted by the cellular telephone. The selection means are, for example, constituted by the keyboard or a vocal command system.

The communication protocol between each terminal 1.1.1 to 1.*n.n*.sub.3 and its associated multi-service server 4.1 to 4.*n* to permit the selection and the reception of audio-visual items stored on the server 2 is managed by the multi-service server 4.1 to 4.*n* through an interface 41.1 to 41.*n* specific to each communication link 51.1 to 51.*n* between a server 4.1 to 4.*n* and the associated terminals 1.1.1 to 1.*n.n*.sub.3. The communication links 51.1 to 51.*n* between a server 4.1 to 4.*n* and the associated terminals 1.1.1 to 1.*n.n*.sub.3 are bi-directional.

The communication link 502.1 to 502.*n* between the server 2 and each multi-service server 4.1 to 4.*n* is bi-directional and, preferably, is a high speed link.

The server 2 then includes a management module 20.1 to 20.*n* for each link 51.1 to 51.*n*, with a multi-service server 4.1 to 4.*n* insofar as this link requires a specific communication protocol. Similarly, each multi-service server 4.1 to 4.*n* is fitted with an interface 40.1 to 40.*n* notably a hardware and a software interface for communication with the server 2.

The operation of the device is substantially identical to that of the device described with reference to FIG. 1A except for the fact that the requests sent by the server 2 to the terminal are translated by the multi-service server 4.1 to 4.*n* associated with the terminal in concordance with the communication protocol between the multi-service server 4.1 to 4.*n* and the terminal 1.1.1 to 1.*n.n*.sub.3. So as to accelerate the processing of the requests from the terminals and the dialogue between the server 2 and the terminals 1.1.1 to 1.*n.n*.sub.3, certain modules or parts of modules can be deported onto the multi-service server 4.1 to 4.*n* associated with the terminal. Hence, the registration procedure for a terminal may be managed at least in part, by a specific module of the multi-service server 4.1 to 4.*n* associated with the terminal. In effect, for most multi-service servers 4.1 to 4.*n*, each terminal is already registered for a particular service from the multi-service server 4.1 to 4.*n*. The terminal therefore has a unique identification on the multi-service server 4.1 to 4.*n*. This identification can be preserved to permit access to the service of distributing audio-visual selections from the server 2.

Similarly, the graphic module of the server 2 can be deported onto each multi-service server 4.1 to 4.*n*. In effect, each multi-service server 4.1 to 4.*n* may have the same type of module to offer its own services. It is therefore sufficient to add the functionalities previously described in this module.

Hence, when a terminal 1.1.1 to 1.*n.n*.sub.3 registered on the associated multi-service server 4.1 to 4.*n* for the service of distributing audio-visual selections, desires access to this service, for the first time, it authenticates itself on its multi-service server 4.1 to 4.*n*. Next, it notifies, for example, the sending of a request or the validation of a command to its multi-service server 4.1 to 4.*n*. The multi-service server 4.1 to 4.*n* verifies, from the identifier supplied by the terminal, that the latter can access the service from the server 2. In the affirmative, the multi-service server 4.1 to 4.*n* sends a request to the server 9 through the communication interface 40.1. On reception of this request, the server 2 sends, by means of a module for communication 20.1 with the respective multi-service server 4.1 to 4.*n*, the necessary information to the multi-service server 4.1 to 4.*n* so that the latter transmits the dialogue screens to the terminal so as to permit the choice or the validation of the choice of at least one audio-visual selection. When the choice is validated, the audio-visual data corresponding to the chosen selection are transmitted by the server 2 to the terminal via the associated multi-service server 4.1 to 4.n. During this transmission, the format of the audio-visual data corresponding to the chosen selection can be modified by the associated multi-service server 4.1 to 4.n so that the format is compatible with the protocol of the communication between the terminal and the associated multi-service server 4.1 to 4.n. In the context of this embodiment example, the multi-service server 4.1 to 4.n may behave like a terminal with respect to the server 2.

Hence, for example, the multi-service server 4.1 to 4.n can manage listening stations or a background music device. In this variant, the multi-service server 4.1 to 4.n is identified at the server to take into consideration the uses which will be made by the listening stations and the reproductions of the selections made as background music.

Hence in this case, and as previously described, a record, for example, in the form of a report file, is implemented on the multi-service server and is updated each time a selection stored on the server is used. Consequently, when a musical selection is played in the context of background music, it must give rise to the payment of specific rights. In order to do this, the report file stores this use. Hence, when the information contained in the report file is transmitted to the server 2, the rights corresponding to a reproduction in public can be calculated for the purpose of receiving payment.

Similarly, a listening station may permit a public reproduction of the selection. In this case, the report file stores the reproduction of each selection in order to be able to calculate the corresponding rights.

Figure 2:
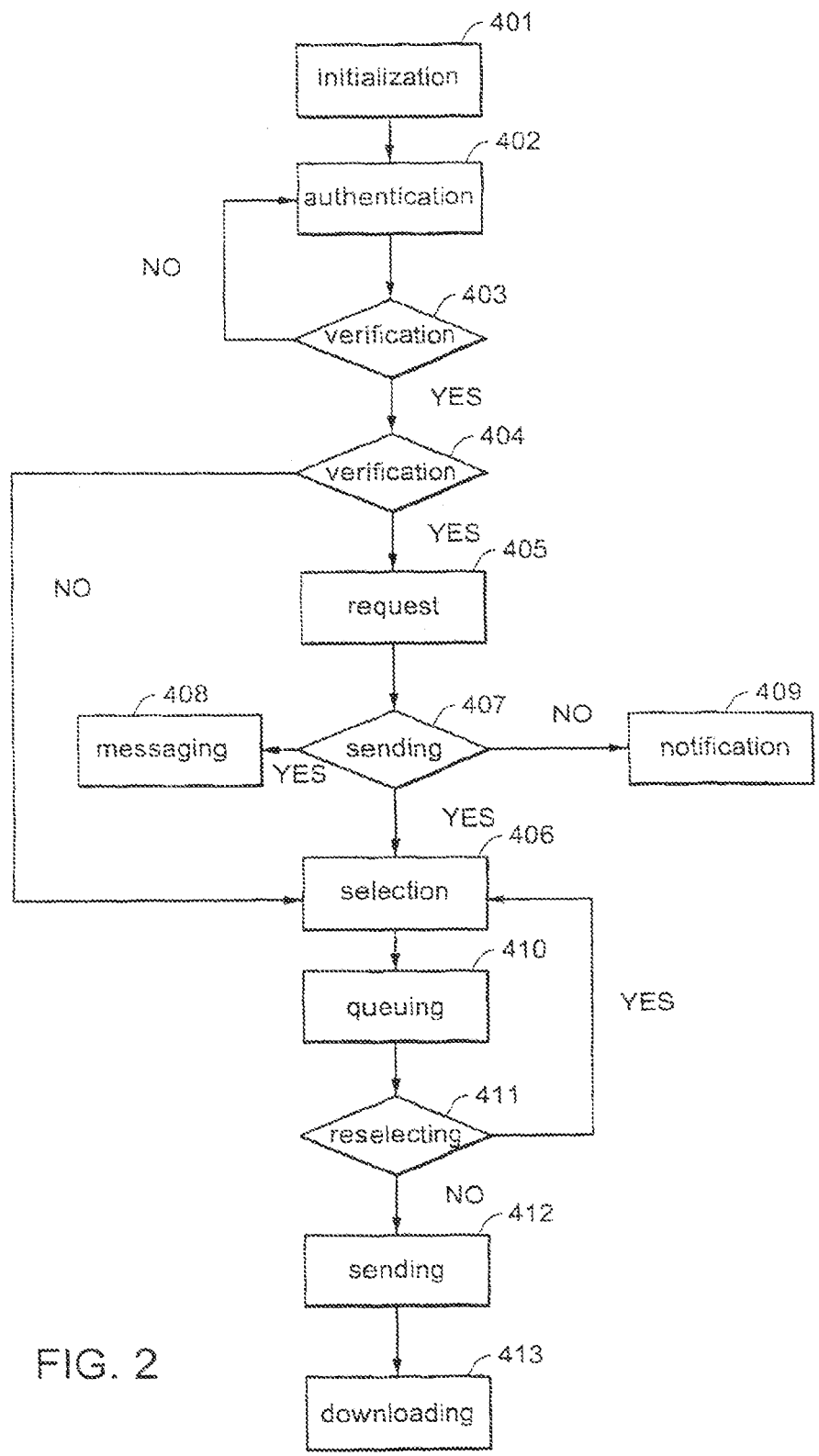
FIG. 2 represents the logic diagram of the operations carried out during the communication between the server and a terminal of the device for the distribution of audio-visual information according to the invention.

The operation of the device according to the invention will now be described making reference to the logic diagram in FIG. 2. This logic diagram represents the succession of operations that occur when a connection is made between the terminal 1 and the server 2. As previously explained, the first connection of a terminal is preceded by a registration procedure in the course of which the terminal 1 is identified to the server and the terminal receives, if the need arises, software elements that permit terminal/server dialogue and the exploitation of the data transmitted by the server 2.

In a first step 401, the link between the terminal and the server is initialized. This initialization corresponds, notably to the connection between the management module 20 of the server and the first circuit 11 of the terminal. Next there is a step requesting authentication 402. In this step, the server 2 sends a request to the terminal through the authentication module 21 to ask for its identifier and its pass word. The reception of this request is translated on the terminal 1, for example, by the display of a welcome screen generated by the graphic interface module 22 of the server 2 or by a graphic module of the terminal comprising a first zone for entering the identifier and a second zone for entering the pass word. The user enters the identifier and the pass word which have been assigned to him during the registration procedure and then validates his entry. This validation permits the sending of a response to the request sent by the server. This step of asking for authentication can be automatic when the identifier and the pass word are stored on the terminal 1. As soon as the request asking for authentication is received by the terminal, the identifier and the pass word are returned to the server without any particular display.

Subsequently a third verification step 403 is carried out at the server 2. This step consists of verifying if the identifier and the pass word correspond to a registered terminal. In the negative, either a new request for identification is sent to the terminal or the connection between the server and the terminal is broken under the initiative of the server. In the affirmative, in a fourth step 404, the authentication module 21 verifies the status specified for the terminal 1, namely if the terminal is authorized to store selections or if the terminal is only authorized to run a selection in real time or if the terminal is authorized to run a previously stored selection an unlimited number of times. If the terminal is authorized to store, a request asking for a report file is sent to the terminal in a fifth step 405. If the terminal is not authorized to store the selections, a sixth step 406 called the selection choice step is triggered. Of course, when other uses of a selection are possible on the terminal 1, corresponding information is contained in the authentication module.

When a terminal 1 which is authorized to store the selection, receives the request asking for the report file, it sends to the server the contents of the report file if this contains information and then empties the file. If the report file is empty, the terminal sends a message indicating that the file is empty. If after a specified period of time, the server does not receive a reply, then it breaks the connection with the terminal in an eighth step or repeats its request. If the server receives a reply, the communication management module 20, on the one hand triggers the sixth selection choice step 406 and, on the other hand verifies if this reply contains information about the running of the selections stored on the terminal. In the affirmative, in a ninth step 409, the management module 20 notifies the data received to the royalty calculation module 24 in order to update its data base for the calculation of royalties.

The selection choice step 406 in fact consists of sending to the terminal either dialogue screens generated by the graphic interface module 22 or vocal messages. These screens include, in particular, the list of available selections, read by the graphic interface module 22 from the selection library 23. Taking into account the number of selections possible, these may be classified by style, by preference, by date of availability or by frequency of demand. The choice of a selection is, for example, validated by using a validation screen. The validation of the selections leads to a tenth step 410 in which the selection is placed in a file constituting the list of selections commanded by the user of the terminal. After validation of a terminal, in an eleventh step, a screen is sent by the server, to determine if another selection choice is desired. In the affirmative, the sixth 406, tenth 410 and eleventh 411 steps are carried out once again. In the negative, the information contained in the file constituting the list of selections commanded is sent, in a twelfth step 412, to the terminal. On receiving this information, the server 2, in a thirteenth step 413, prepares to send digital data corresponding to the selections on the list. This preparation depends on the type of terminal 1, that is to say, if the terminal is authorized or is not authorized to store the transmitted information. If the terminal is authorized to store, before sending the selections chosen, the communication management module 20 of the server 2 notifies the royalty calculation module 24 to record the copying rights due for the downloading of each selection on the list. If the terminal is not authorized to store the selections, that is to say the terminal only allows listening to the selections in real time, the communication management module 20 of the server 2 notifies the royalty calculation module 24 to record the reproduction rights of each selection on the list of selections commanded and possibly copying rights depending on the legislation currently in force.

Following the sending of the digital data corresponding to the selections commanded to the requesting terminal, a screen generated by the graphic interface module 22 can be sent to the terminal 1 to enable the user, either to again command at least one selection and then again run through the process starting with the selection step or to shut down the connection with the server 2.

So as to increase the security of the device with respect to illegal copies or reproductions, the encryption method integrates at least two encryption keys. When a terminal is registered it receives the two keys which are not known to the user.

A first encryption key is identical for every transmission to all the terminals and permits identification of the source of the data, that is to say, the server 2. In contrast, the second key is specific, not only to the terminal but also to the type of use which is to be made of the selections. Hence, a terminal which is not authorized to store the digital data representative of the selections will have available a key which does not allow it to decrypt the digital data intended for a terminal authorized to store the digital data and will have a key available that permits another type of use. Similarly, the second encryption key is different when the selection is to be played back in a public place or if it is the subject of a one-off payment of royalties.

The software elements installed on the terminal 1 may include means of collecting statistical information, for example, about the use made of the selections stored on the terminal 1 or on the mode and the periods of the day during which connections to the server are made. These collection means comprise means of storing statistical information in a file that reports on the data storage means of the terminal. The collection means comprise means of transmitting, to the server 2, the information contained in this file when a connection is made from the terminal to the server 2. Hence, information such as the date on which the selections were replayed, the order in which the selections were chosen and the duration of the connection can be stored and then sent to the server 2 to be subsequently used for commercial purposes. Similarly, when the terminal 1 is being registered, information on the profile of the user or users can be logged so as to complement the recorded statistics.

Hence, in particular, the information collected by the server 2 and showing the use made of the selections sent to the terminal can be cross referenced with the profile of the user or any other statistical parameter for the purpose, for example, of carrying out market research.

The device according to the invention also integrates means of payment for the selection commands. These means of payment can be physically present on the terminal and/or integrated with the process of communication between the terminal and the server. In both cases, the payment for the selections can intervene at several moments in the process.

For reasons of simplifications, "credit" will mean the sum necessary to command a selection. In a first variant the credit or credits can be prepaid. In other words, each terminal includes a credit account stored on the data base and administered by a specific module of the server 2. This account is credited by the specific module every time the user of the terminal associated with the account desires it. This modification can be accommodated by the graphic interface module 22 through a set of specific remote payment screens.

A credit is debited from the account by the specific module every time a selection is validated by the user of the terminal 1.

The second method of payment can be payment on each selection. In this case, the payment is made during the connection between the server and the terminal. Hence, at specific instants of the connection, the interface module 22 sends a set of specific screens, either for remote payment or for payment through the terminal's payment means. In this case, as long as the payment procedure is not validated by a payment module of the server or as long as the sum paid does not correspond to the number of credits required for the payment of the selections commanded, the sending of the selections is not triggered.

The third method of payment is based on a regular payment for the command of selections. In this mode of payment, every time a song is sent to a terminal 1, a payment module of the server updates an account associated with the terminal. Afterwards and periodically, the payment module of the server publishes an invoice which is sent to the user of the terminal 1 associated with the account in order to settle the account. In this method of payment, the authentication procedure can be complemented by a method of verifying credit, triggered by the payment module. If a credit payment is not made, the payment module notifies the graphic interface module 21 to generate a screen which states the credit situation. This screen is then transmitted to the terminal by the communications management module of the server to be displayed on the display means of the terminal. The screen includes, for example, a reminder of the credit situation and an invitation to regularize the situation. Subsequently the server either triggers the pursuit of the command procedure or breaks off the connection with the terminal.

As previously explained, the payment can operate at various moments in the procedure of communication between the server and the terminal. Hence, payment can be requested before the selection step 406. In this case, the user of the terminal is invited, by means of a display screen, to indicate how much credit he wants to obtain or how many selections he wishes to make. In another variant, the user of the terminal is invited, by means of a screen, to pay the sum of money that he wishes and the server 2 on reception of the information corresponding to this sum, sends back the number of credits allocated.

Payment can be made either after each selection, before the updating of the file constituting the list of songs commanded or after validation of the choice of the last selection before the sending of the information contained in the file constituting the list of selections commanded.

What is claimed is:

1. A method of operating a digital jukebox system in which a server is connected to a plurality of jukeboxes, each said jukebox being configured to play audiovisual selections in response to user requests, wherein the server is configured to operate in connection with a processor to at least (a) define, for the jukeboxes, authorized uses of the audiovisual selections playable thereon, the authorized uses corresponding to rights that third parties have in the audiovisual selections, the rights requiring payment of royalties for the authorized uses of the audiovisual selections, and (b) verify, for the jukeboxes, the authorized uses to which the jukeboxes may put the selections, the method comprising:
maintaining information on the authorized uses made by the jukeboxes; and
determining the amount of royalties due for actual authorized uses.

2. The method of claim 1, wherein the rights include master recording rights, mechanical rights, synchronization rights, and public performance rights.

3. The method of claim 1, wherein the authorized uses include playing the audiovisual selection without storing the audiovisual selection on the jukebox, storing the audiovisual selection on the jukebox for unlimited play, and storing the audiovisual selection on the jukebox for a single play.

4. The method of claim 1, wherein each of the rights has a different required royalty, and further comprising maintaining information on the amount of each royalty for use in determining the amount of royalties due for each authorized use made by the jukeboxes.

5. The method of claim 1, wherein uses to be made by the jukebox include playing the audiovisual selection without storing the audiovisual selection on the jukebox, storing the audiovisual selection on the jukebox for unlimited play, and storing the audiovisual selection on the jukebox for a single play.

6. The method of claim 1, further comprising transmitting to the jukeboxes from the server validation information indicating permissible usage types for the audiovisual selections.

7. The method of claim 6, wherein the permissible usage types include at least (a) storage of data corresponding to the audiovisual selections in one or more of a plurality of formats, (b) prevention of storage of the data, and (c) playback of the audio-visual selection included in the data.

8. The method of claim 7, wherein the plurality of formats include MMP, MP3 and WAV.

9. The method of claim 1, wherein different selections have different defined authorized uses.

10. The method of claim 1, wherein at least some data transmitted from the server to the jukeboxes is both encoded and encrypted.

11. The method of claim 1, wherein one or more multi-service servers are interposed between the server and the jukeboxes.

12. The method of claim 1, wherein a plurality multi-service servers is interposed between the server and the jukeboxes, each said multi-server server being connected to the server and one or more jukeboxes.

13. The method of claim 12, wherein at least one multi-service server includes a system for the distribution of television programs by cable that includes a return channel.

14. The method of claim 12, wherein at least one multi-service server includes a mobile telephone operator.

15. The method of claim 1, further comprising transmitting to the jukeboxes from the server validation information indicating permissible usage types for the audiovisual selections, the validation information instructing the jukeboxes whether, how, and where to store media of different formats.

16. The method of claim 15, wherein the different formats include MMP, MP3 and WAV formats.

17. The method of claim 1, wherein audiovisual selections playable on the jukebox devices are received from the server.

18. The method of claim 1, wherein payments are required by law or regulation.

19. The method of claim 1, further comprising assigning authorized uses of the audiovisual selections at the server for jukeboxes in connection with a code or unique key.

20. The method of claim 19, wherein the assigning is performed on an individual jukebox-by-jukebox basis.

* * * * *